United States Patent [19]
Clark

[11] 3,750,377
[45] Aug. 7, 1973

[54] WEED CUTTER
[75] Inventor: Jerald R. Clark, Maricopa, Ariz.
[73] Assignee: Farmers Investment Company, Sahuarita, Ariz.
[22] Filed: Oct. 4, 1971
[21] Appl. No.: 186,297

[52] U.S. Cl. ............... 56/10.4, 56/229, 56/DIG. 15
[51] Int. Cl. .......................................... A01d 35/26
[58] Field of Search .................. 56/10.2, 10.4, 255, 56/295, DIG. 15, 229

[56] References Cited
UNITED STATES PATENTS
3,526,083   9/1970   Barry et al. .................... 56/DIG. 15
2,838,901   6/1958   Davis ............................ 56/10.4 UX
FOREIGN PATENTS OR APPLICATIONS
6,600,513   7/1961   Netherlands ....................... 56/10.4

Primary Examiner—Russell R. Kinsey
Assistant Examiner—J. A. Oliff
Attorney—William C. Cahill et al.

[57] ABSTRACT

The present invention, attached to a moving vehicle and conveyed through a weed infested orchard, cuts the weeds without causing injury to the tree trunks or tree roots. A horizontally oriented cutting blade, angled at approximately 45° with respect to the direction of travel, rides beneath the surface of the soil cutting the weeds. A plurality of these blades are equiangularly disposed about a rotatably positionable platform. The platform is angled with respect to horizontal such that only one blade is in contact with the soil at any one position of the platform. A feeler extends forwardly of the platform to detect any trees in the path of the cutting blade. Upon detection of a tree, the feeler trips a release mechanism, which permits the platform to rotate due to the drag of the embedded blade. Rotation of the platform will, because of the angular relationship of the platform, the blades, and the soil, cause the then embedded blade to rotate and rise above the soil. Simultaneously, another of the cutting blades will be rotated until it comes into contact with the soil and embeds itself to resume the weed cutting function. During the rotation of the platform, the position of the tree with respect to the moving platform is such that the aforementioned cutting blades pass on either side of the tree thereby preventing them from inflicting damage to the tree. In this manner, weeds growing between trees in a row of trees may be mechanically cut without causing any injury to the trees.

10 Claims, 7 Drawing Figures

WEED CUTTER

This invention relates to the crop cultivating art and, more particularly, to weed cutting devices.

Weeds, the scourge of farmers, rob the soil of nutrients and hinder the cultivating and harvesting of various crops. To reduce their deleterious effects, various methods of weed control have been attempted. Some are simply ineffective and others effective, but very costly. The most effective means has been that of employing hordes of laborers with appropriate instruments to sever the leafy portions of the weeds from their roots, thereby killing them. Because of the contemporary status of labor, this solution is no longer economical. As a result of rising labor costs, a plurality of devices attempting to cut or kill the weeds have been proposed. Most of the more effective devices employ some type of a cutting blade riding beneath the surface to separate the leafy portion of the weeds from their roots. In theory, this method is very satisfactory but is presents the problem of using the device in and amongst the crops such as grapes, apple trees, and other types of fruit trees without damaging the crops.

In the prior art, cutting devices used within and between rows of upstanding fruit trees employed a feeler mechanism placed ahead of the cutting device such that, on sensing a fruit tree, it would activate a mechanism for raising and laterally moving the cutting blade to prevent damage to the tree. These devices, though generally effective, suffered from a major drawback in that they require auxiliary power means to raise the cutting device. This power means, whether it be electrical, hydraulic, or a mechanical takeoff from the moving vehicle, is expensive and generally requires a particular type of vehicle for operating the cutting blade.

It is therefore a primary object of the present invention to provide a simple, non-power-assisted weed cutter for use in and about orchards.

Another object of the invention is to provide a weed cutting mechanism which may be mounted on any type of moving vehicle.

Another object of the present invention is to provide a weed cutting mechanism which will kill weeds about the base of trees without damaging the tree trunks.

Another object of the invention is to provide a weed cutting mechanism which permits facile replacement of bent or damaged cutting blades.

Another object of the present invention is to provide a weed cutting mechanism which is mechanically simple and cheap to manufacture.

Another object of the present invention is to provide a reliable weed cutting mechanism which has a minimum of moving parts subject to wear or damage from the environment.

Another object of the present invention is to provide a weed cutting mechanism, the actuation of which may be manually biased.

These and other objects of the present invention will become apparent to those skilled in the art as the description thereof proceeds.

The present invention may be described by reference to the accompanying drawings, in which.

Figure 1:
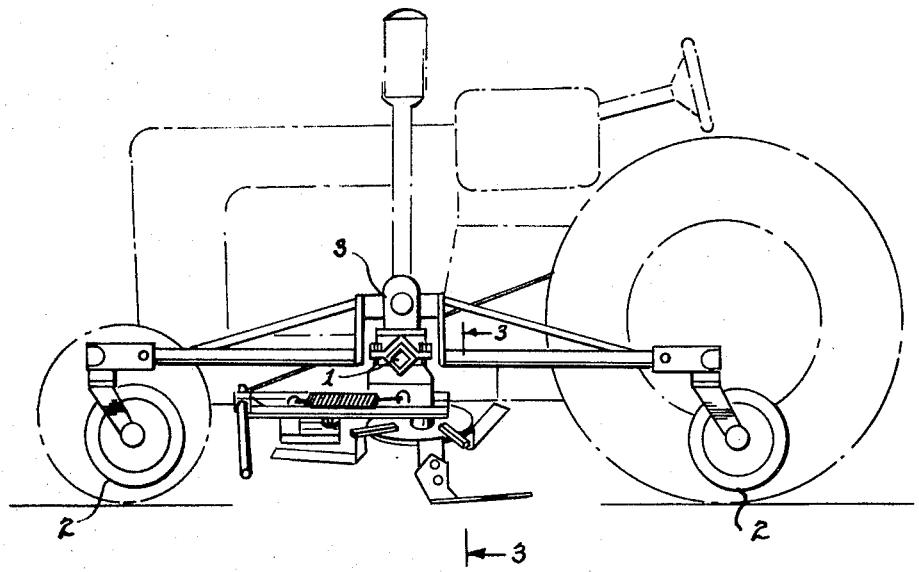
FIG. 1 is a side view of the present invention mounted on a farm tractor.

Referring to FIG. 1, there is shown a side view of the present invention, including a type of vehicle upon which it may be mounted; that is, a standard farm tractor. The means for mounting the invention comprises a hydraulically operated support bar 1. As will become apparent as the description proceeds, this bar may be raised or lowered through hydraulic means associated with the tractor. In normal operation the bar generally lies in its lowest vertical position due to its mass and the mass of any attachments thereto. In order to suspend the mechanism of the present invention at a relatively constant height with respect to the surface of the soil, a pair of hinged follower wheels 2 may be mounted onto the support bar. The function of these wheels is that of raising and lowering the mechanism of the present invention with respect to the tractor to conform with any undulations of the surface of the soil. Thereby, the operating portions of the present invention will ride at the relatively constant height with respect to the surface of the soil. If the path of the vehicle is upon a generally flat surface whereby the support bar 1 will not fluctuate vertically, the follower wheels 2 may be omitted. However, as a practical matter, such a situation is rarely encountered due to irrigation ditches or earthen mounds for effecting control. In most support members presently in use, the member itself is generally square; however, its orientation is such that the corners of the square lie on horizontal and vertical axes. Thus, the attachment means 3 must be configured so as to attach the invention to the support member 1 in a generally vertically oriented configuration as shown. If a tractor is unavailable, the instant invention may be mounted on a truck or any other available vehicle, even a horse drawn carriage.

Figure 2:
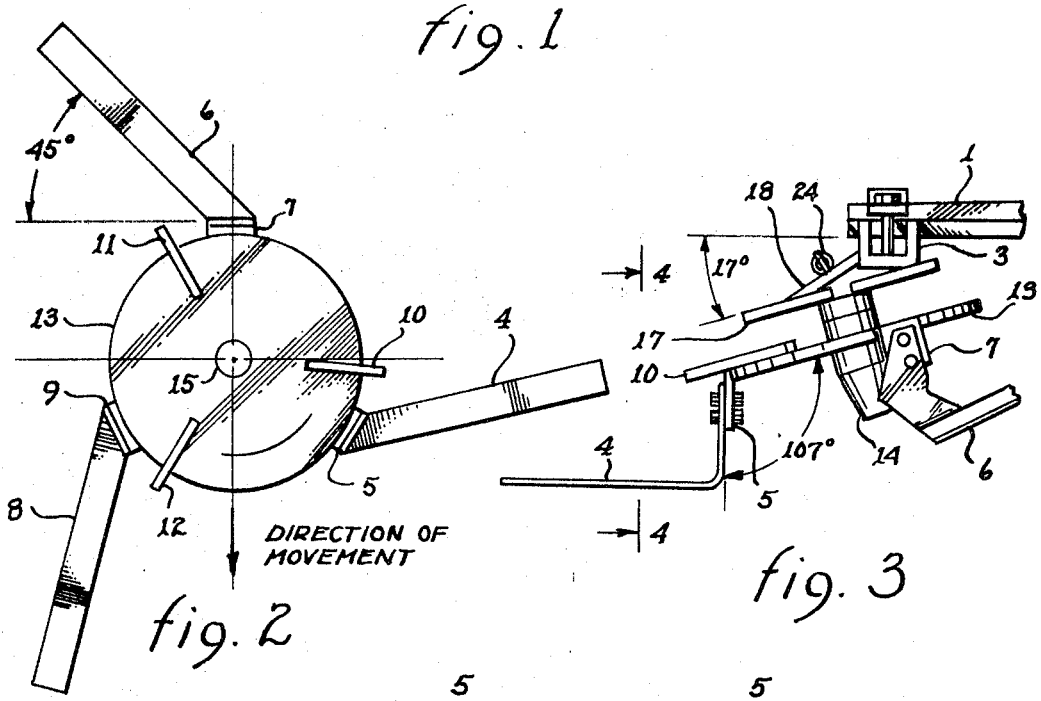
FIG. 2 is a top view of the rotating platform constructed in accordance with the present invention.
Figure 3:
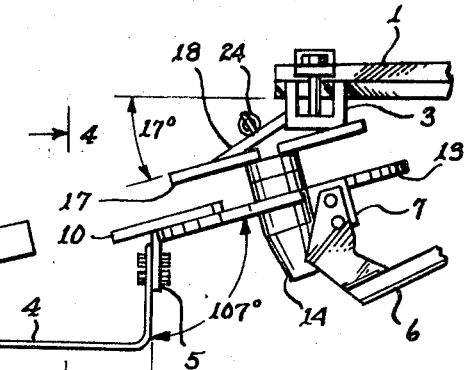
FIG. 3 is a rear side view of the rotating platform constructed in accordance with the present invention taken along the line 3—3 of FIG. 1.

FIG. 2, in conjunction with FIG. 3, illustrates the heart of the invention. A trio of cutting elements are equi-angularly spaced about a platform. The shape of each individual cutting element, as shown in the preferred embodiment illustrated, includes two distinct parts: blades 4, 6, 8 and supports 5, 7, 9. Each blade performs the cutting function to the corresponding blade having one edge sharpened. Each support is bent normal in one axis, but angularly displaced thereto by 45° in another axis, whereby the sharpened edge forms an angle of 135° with the major plane of the corresponding support. Each of the three supports are preferably attached to the periphery of the rotating platform 13 at an angle of approximately 17° with respect to the axis of rotation of platform 13.

A plurality of extensions 10, 11, 12 functionally cooperate with blades 6, 8, and 4, respectively. Extension 10, for example, is displaced with respect to blade 6 approximately 90° in a direction counter to the direction of rotation of platform 13. Similarly, extension 12 is displaced approximately 90° from cutting blade 4, and extension 11 is displaced approximately 90° from cutting arm 8. Each of these extensions are radially aligned on platform 13 and extend beyond the edge thereof by a predetermined amount.

Figure 4:
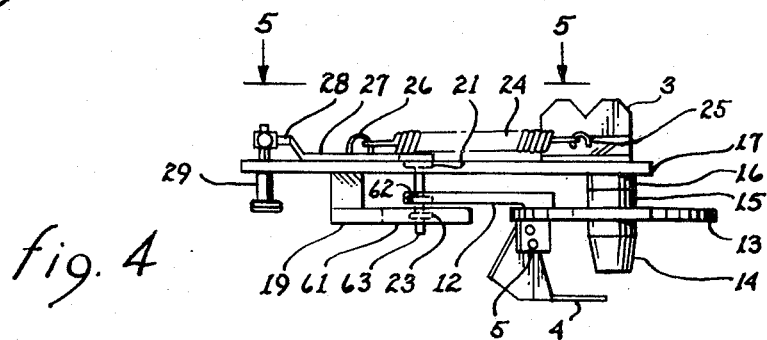
FIG. 4 is a side view of the release mechanism constructed in accordance with the present invention taken along the line 4—4 of FIG. 3.

As shown in FIGS. 3 and 4, the rotating platform 13 has attached at the center thereof hubs 14 and 15 cooperating with a fixed member 16 through a journaled axle (not shown), whereby platform 13 may rotate with respect to member 16. Member 16 is fixedly attached to a base 17, through either a welding process or by bolts, whichever economics dictate. Base 17 is directly attached to member 3 at one point and through brace 18 at another point. The function of brace 18 is that of offsetting base 17 by an angle of approximately 17° from horizontal, or such other angle equivalent to the angle of attachment of the blades with respect to axis of rotating platform 13 as previously discussed. This arrangement permits blade 4, when positioned as shown in FIG. 3, to be essentially horizontal and parallel to support member 1. By inspection, it may be readily determined that the remaining two blades, 6 and 8 will be positioned vertically above the plane described by blade 4. Thus, it will be observed that when blade 4 is embedded within the soil, the remaining two blades will be raised above the surface of the soil and not subject to the drag thereof.

Figure 5:
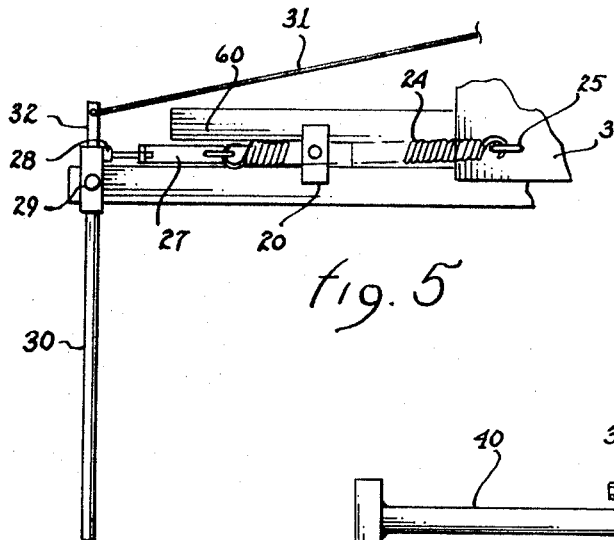
FIG. 5 is a top view of the release mechanism constructed in accordance with the present invention taken along the line 5—5 of FIG. 4.

FIGS. 4 and 5 illustrate the side and top views, respectively, of the release mechanism which cooperates with extensions 10, 11, and 12 for selectively permitting platform 13 to rotate. Base 17 is extended forwardly in the direction of the movement of the vehicle to support and provide the guiding means for the release mechanism. In the presently preferred embodiment, the forward portion of base 17 includes a slot 60. An L-shaped member 19 is attached to a forward portion of base 17 and extends downwardly and rearwardly therefrom. The horizontal portion of L-shaped member 19 has a slot 61 disposed therein coincidental with the slot 60 in base 17. A vertically oriented rod 63 is disposed within the slots 60, 61 in base 17 and L-shaped member 19 and contacts them through a set of roller bearings 21 and 23, respectively, each of which is slightly smaller in diameter than the respective slot. Thereby, any lateral force on rod 63 will cause each of the roller bearings to impinge upon the opposite side of their respective slots, and the forward or rearward movement of the rod will be facilitated by the rolling action of the bearings 21 and 23 on the respective side of the slots. A stop 20 is attached to the upper portion of rod 63 and cooperates with base 17 to vertically position rod 63.

At the forward extremity of base 17 there is a pivot 29 for feeler arm 30 and extension 31. A follower 27 is pivotally connected to extension 31 and the vertical rod 63, or if desired, to stop 20. By inspection, it may be seen that as the feeler arm 30 rotates about the pivot 29, extension 31 will similarly rotate; and rotation of extension 31 will cause follower 27 to move forwardly or rearwardly. As the rod 63 is attached to follower 27, it too will move forwardly or rearwardly in response to feeler arm 30. A spring 24 connected to a stationary portion of base 17, such as flange 25 is connected to follower 27 at flange 26 to bias the follower 27 and hence the feeler arm 30 such that the rod 63 is biased at its most rearward position governed by the slots 60, 61 within base 17 and L-shaped member 19.

The attachment of rotating platform 13 to base 17 is configured such that each of the extensions 10, 11, and 12 alternately rotate through the space defined by base 17 and L-shaped member 19. A third roller bearing 62 is disposed on rod 63 between the base 17 and L-shaped member 19 such that it will contact, when the rod 63 is in its rearwardmost position, one of the extensions 10, 11, or 12. This contact will inhibit rotation of platform 13.

A force exerted upon feeler arm 30 in the rearward direction will cause rod 63, through follower 27, to be moved forwardly. The forward movement of rod 63 will cause roller bearing 22 to rotate along extension 12 (as shown in FIG. 4) and beyond the extremity of extension 12. At this point, the platform 13 is free to rotate due to the drag of the soil exerted on the blade then embedded therein. In the configuration shown in FIG. 4, blade 4 would be the blade embedded in the soil. The rotation of platform 13 due to the drag on blade 4 causes blade 4 to swing rearwardly and rise above the surface of the soil. Simultaneously, the blade following blade 4, which would be blade 8 according to FIG. 2, and which was previously above the surface of the soil, rotates and swings downwardly until it contacts the soil and embeds itself therein. This sequence of operation would then be repeated with respect to blade 6, etc. if the platform 13 were permitted to continue to rotate.

As the function of the instant invention is that of preventing the weed cutting blades from contacting and damaging tree trunks or other crops growing out of the ground, it will be understood that the purpose of feeler 30 is to detect these plants and instigate an action causing the blade path to change and circumvent the tree trunk. The present invention accomplishes this function in the following manner. The feeler arm 30, when it detects a tree trunk, causes the approaching blade to rotatably swing away from the tree trunk. Simultaneously, the next adjacent blade swings downwardly to take the position held by the previous weed cutting blade. However, due to the simultaneous forward movement and rotation of platform 13, the endangered tree trunk is passed with the tree between the two adjacent blades such that neither blade will contact or damage the tree. The previously embedded weed cutting blade lifts from the soil close to one side of the tree trunk and the succeeding blade embeds itself close to the other side of the tree trunk, thereby all weeds but those immediately adjacent the tree trunk are cut by the blades. After the feeler 30 has come in contact with the tree trunk and passed it due to the forward movement of the vehicle, the feeler arm 30 disengages from the tree and spring 24 will urge it back to its previous position. As the feeler 30 moves under force of the spring 24, the rod 62 will move rearwardly and into the path of the next adjacent extension, which according to FIGS. 2 and 4, would be extension 11. On contact with the roller bearing 22, extension 11 orients weed cutting blade 8 in the position shown for blade 4 in FIG. 4 and thereby blade 8 resumes the weed cutting operation.

The angle of each of the blades with respect to a radial at the point of attachment of the blades to the platform 13 has been found to be optimum at 45°. At this angle, any strongly rooted weeds which might not be cut by the force of the blade striking them will be cut due to the sawing action produced by the rearwardly slanted blade as the weed root slides along the blade. The angle of each of the blades, when embedded in the soil, is purposely designed to be horizontal in order that the whole length of the blade will be at the uniform distance below the surface of the soil. The advantages obtained hereby are twofold. First, most cultivated areas have several inches of essentially rock free humus so that, if the blade is maintained within this rock free area, there is a low probability of striking an immovable object which might cause damage to the blade. Secondly, the depth of the blade may be easily controlled by the vertical orientation of the apparatus with respect to the surface of the soil such that the blade will ride at a position that is optimum for cutting and killing the weeds. Should one of the blades be damaged, it may be simply unbolted from its respective support (7, 8 or 9) and replaced by a spare blade.

In dense weed environments or where there may be weeds of unusual firmness, these weeds may, when contacting feeler 30, cause feeler 30 to pivot and permit rotation of platform 13 and the interruption of the weed cutting operation. This, of course, is undesirable. To inhibit such weeds from pivoting feeler 30, a cord 64 may be connected to extension 31 and manipulated by the operator of the moving vehicle such that additional bias may be applied to the feeler 30 to prevent it from inadvertently releasing the locked platform.

Figure 6:
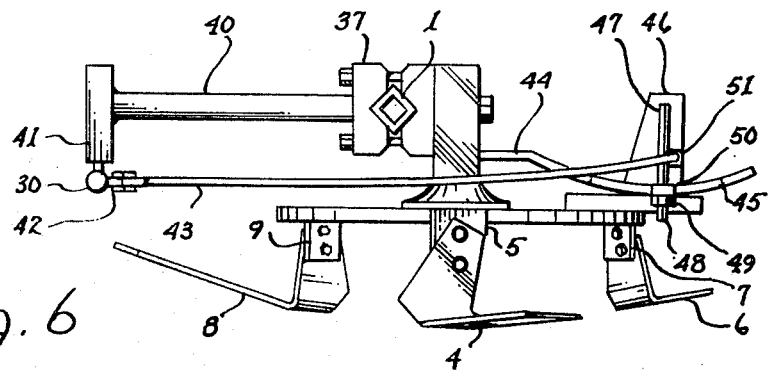
FIG. 6 is a side view of a modification of the release mechanism constructed in accordance with the present invention.
Figure 7:
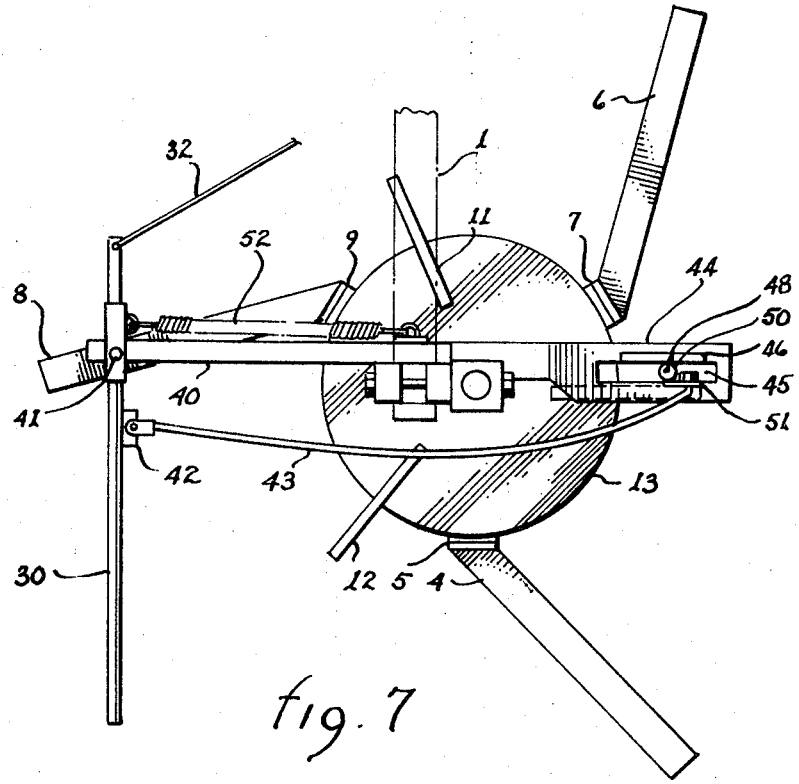
FIG. 7 is a top view of a modification of the release mechanism constructed in accordance with the present invention.

FIGS. 6 and 7 illustrate the side and top views, respectively, of a modification to the lock and release mechanism. Feeler arm 30 is pivotally mounted on a forwardly extending support 40 at pivot 41. Attached to feeler arm 30 is a flange 42 to which a rearwardly extending arm 43 is connected. A guide member 44, including a slot 45, extends rearwardly from the point of its support from the rotating platform 13. A flange 46 extends vertically from guide member 44 and includes a pivot 47. A downwardly extending rod 48 including a flange 51 is pivoted at pivot 47. The rearwardly extending arm 43 is pivotally attached to flange 51 whereby a pivotal movement of feeler arm 30 will cause, through horizontal movement of arm 43, the rod 48 to pivot about pivot 47. The rod 48 extends through slot 45 and by means of a roller bearing 50 is guided therein. A second roller bearing 49 is attached to rod 48 below the guide member 44. This second roller bearing 49 cooperates with the extensions 10, 11 and 12 respectively, extension 10 being shown in the Figures as resting against roller bearing 49. The length of the slot 45 and the leverage of feeler arm 30, arm 43, and rod 48 is such that as feeler arm 30 translates rearwardly through a predetermined angle, rod 48 and its attached roller bearing 49 will extend rearwardly beyond extension 10 to release extension 10 and thus permit the platform 13 to rotate.

Spring 52 is included to maintain feeler arm 30 at a position approximately normal to the direction of travel. An additional bias means hand operated by a cord 32 may be included to prevent release of the blades 4, 6, and 8 in instances where heavy brush or weeds would otherwise inadvertently actuate feeler arm 30. The position of the extensions 10, 11, and 12 are functionally similar to the same numbered extensions as shown in FIGS. 2 through 5. However, their position with respect to the blades 4, 6, or 8 may be somewhat altered circumferentially about rotating platform 13 in order to orient the support of the active cutting blade at approximately 90° with respect to the direction of travel. The guide member 44 may be somewhat curved equivalent to the arc described by the pivoting member 48 in order that roller bearing 50 cooperating within the slot 45 be supported throughout the arcuate length defined by the pivot 48.

As will be readily apparent from the above description, the apparatus of the present invention is not dependent upon the cooperation of intricately formed finely adjusted mechanisms. Rather, the present invention is simply dependent upon the interaction of a very few loosely fitted movable parts to solve a long existing problem in a straightforward and simple way. The simplicity of the present invention further enhances its utility in the environment for which it is intended in that accumulation of even large amounts of dirt will not deleteriously affect its performance. Therefore, the device is eminently practical as well as simple. The simplicity of the present invention is also reflected in the low cost of manufacturing and assembling the components thereof. Thus, the use of the present invention on almost any sized farm is feasible and forseeable.

I claim:

1. A below ground weed cutting device mounted on a vehicle, including a plurality of cutting blades, each of said blades, in seriatim, extending essentially transverse to the direction of travel when engaging the soil, said device comprising:
   A. a mounting structure extending from the vehicle;
   B. a platform rotatably suspended from said structure, the axis of rotation of said platform being angled with respect to a vertically extending axis,
   C. means connected to said platform for supporting individual ones of said plurality of cutting blades;
   D. said supporting means positioning each of said cutting blades at an angle with respect to the plane of said platform, which angle is equivalent to the angle between the axis of rotation of said platform and said vertically extending axis;
   E. a plurality of radial extensions mounted on said platform, each of said extensions defining an operating position of said device;and
   F. a release mechanism operably associated with said extensions to permit intermittent rotation of said platform, for selectively positioning each of said cutting blades, in seriatim, parallel to and beneath the surface of the soil.

2. The device as set forth in claim 1 wherein the angle between the axis of rotation of said platform and said vertically extending axis is 17°; and the angle between the cutting blades and the plane of said platform is 17°.

3. The device as set forth in claim 1 wherein said cutting blades extend from said platform at an angle of 45° with respect to a radial line of said platform.

4. The device as set forth in claim 3 wherein the 45° angle of said cutting blades with respect to a radial line trails the radial line with respect to the direction of rotation.

5. The device as set forth in claim 1 wherein said release mechanism comprises:
   A. a pivotable feeler arm extending in front of and across the path of travel of said cutting blades and adapted to pivot in response to contact with a vertical obstruction;
   B. a stop radially mounted with respect to said platform and operably responsive to a pivotal movement of said feeler arm; said stop acting as a restraint for said extensions until said feeler arm is pivoted; and C. a spring biasing said feeler arm counter to the expected pivotal movement.

6. The device as set forth in claim 5 including a manually operated restraint to aid the bias of said spring.

7. The device as set forth in claim 5 wherein said mounting structure extends transverse to the direction of travel.

8. The device as set forth in claim 1 wherein one of said cutting blades is positioned transverse to the path of travel at each one of said operating positions.

9. The device as set forth in claim 8 wherein said supporting means comprises a plurality of flanges depending from said platform at an angle of 107° with respect to the plane of said platform, each of said flanges being associated with one of said cutting blades.

10. The device as set forth in claim 9 wherein said supporting means positions each of said cutting blades at an angle of 90° with respect to the associated one of said flanges, whereby one of said cutting blades is positioned in a horizontal plane at each one of said operating positions.

* * * * *